US012663949B2

(12) United States Patent (10) Patent No.: US 12,663,949 B2
Kunert (45) Date of Patent: Jun. 23, 2026

(54) LABORATORY ANALYZER

(71) Applicant: Roche Diagnostics Operations, Inc., Indianapolis, IN (US)

(72) Inventor: Natalie Kunert, Ludwigsburg (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 17/456,003

(22) Filed: Nov. 22, 2021

(65) Prior Publication Data

US 2022/0197578 A1 Jun. 23, 2022

(30) Foreign Application Priority Data

Dec. 17, 2020 (EP) .................................... 20215126

(51) Int. Cl.
  *G06F 3/14* (2006.01)
  *B01L 3/00* (2006.01)
  *B01L 9/00* (2006.01)
  *G06F 3/01* (2006.01)
  *G06F 3/041* (2006.01)
(52) U.S. Cl.
  CPC .................. *G06F 3/14* (2013.01); *B01L 3/50* (2013.01); *B01L 9/00* (2013.01); *G06F 3/017* (2013.01); *G06F 3/041* (2013.01); *B01L 2300/023* (2013.01); *B01L 2300/027* (2013.01); *B01L 2300/168* (2013.01)
(58) Field of Classification Search
  CPC . G06F 3/14; G06F 3/017; G06F 3/041; B01L 3/50; B01L 9/00; B01L 2300/023; B01L 2300/027; B01L 2300/168
  See application file for complete search history.

(56) References Cited

U.S. PATENT DOCUMENTS

| 8,172,400 | B2 * | 5/2012 | O'Connell | ............. | G02B 30/56 |
| | | | | | 353/30 |
| 9,526,459 | B2 | 12/2016 | Blair et al. | | |
| 10,506,052 | B2 | 12/2019 | Abraham et al. | | |
| 10,648,993 | B2 | 5/2020 | Lüdicke et al. | | |
| 11,047,845 | B1 * | 6/2021 | Barry, Jr. | ............... | G01N 15/14 |

(Continued)

FOREIGN PATENT DOCUMENTS

| DE | 202011052366 U1 | 1/2012 | | |
| EP | 2682754 A1 * | 1/2014 | ............. | G01N 33/53 |

(Continued)

OTHER PUBLICATIONS

European Search Report issued Jun. 15, 2021, in Application No. 20215126.2, 2 pp.

*Primary Examiner* — Temesghen Ghebretinsae
*Assistant Examiner* — Sosina Abebe
(74) *Attorney, Agent, or Firm* — Taft Stettinius & Hollister LLP

(57) ABSTRACT

A laboratory analyzer is disclosed. The laboratory analyzer comprises a housing at least partially enclosing at least one analyzing instrument and at least one display device, wherein the display device comprises at least one screen, wherein the screen is partially transparent and reflective, wherein the screen is integrated into the housing, wherein the display device is configured for displaying screen information on the screen such that the screen information is visible and/or readable from outside the housing.

29 Claims, 1 Drawing Sheet

(56) References Cited

U.S. PATENT DOCUMENTS

| | | | | |
|---|---|---|---|---|
| 2004/0257649 | A1* | 12/2004 | Heikkila | G03B 21/56 |
| | | | | 359/443 |
| 2012/0105424 | A1* | 5/2012 | Lee | G06F 3/041 |
| | | | | 345/212 |
| 2012/0285089 | A1* | 11/2012 | Artwohl | A47F 3/0434 |
| | | | | 49/70 |
| 2013/0266952 | A1 | 10/2013 | Goemann-thos et al. | |
| 2014/0022283 | A1 | 1/2014 | Chan et al. | |
| 2015/0127270 | A1* | 5/2015 | Goemann-Thoss | G01N 33/48 |
| | | | | 702/31 |
| 2015/0131913 | A1* | 5/2015 | Anderson | G06F 3/0425 |
| | | | | 382/203 |
| 2015/0153777 | A1* | 6/2015 | Liu | G06F 1/1643 |
| | | | | 345/173 |
| 2015/0293355 | A1* | 10/2015 | Pouliquen | G02B 27/0101 |
| | | | | 345/7 |
| 2016/0195849 | A1* | 7/2016 | Takagi | G06F 3/017 |
| | | | | 348/40 |
| 2016/0274662 | A1* | 9/2016 | Rimon | G06F 3/16 |
| 2017/0013188 | A1* | 1/2017 | Kothari | B60R 1/00 |
| 2017/0176479 | A1* | 6/2017 | Lüdicke | G06F 3/04847 |
| 2018/0015215 | A1* | 1/2018 | Peters | A61M 1/14 |
| 2018/0096519 | A1* | 4/2018 | Tokubo | A63F 13/56 |
| 2019/0037170 | A1* | 1/2019 | Zimmerman | H04N 23/73 |
| 2019/0388898 | A1* | 12/2019 | Bernet | G01N 35/1011 |
| 2020/0049725 | A1 | 2/2020 | Torres et al. | |
| 2020/0312448 | A1* | 10/2020 | von Allmen | H04N 7/185 |
| 2021/0181218 | A1* | 6/2021 | Gisler | G01N 35/04 |
| 2021/0190804 | A1* | 6/2021 | Schoeder | B01L 3/502715 |
| 2022/0276274 | A1* | 9/2022 | Davis | G01N 35/00722 |
| 2023/0228776 | A1* | 7/2023 | Miniaci | G06F 3/013 |
| | | | | 422/50 |

FOREIGN PATENT DOCUMENTS

| | | | | |
|---|---|---|---|---|
| GB | 2348002 | A | 9/2000 | |
| GB | 2601910 | A * | 6/2022 | G06F 3/01 |
| WO | WO 8202484 | | 8/1982 | |
| WO | 2017/007492 | A1 | 1/2017 | |
| WO | 2021/041216 | A1 | 3/2021 | |

* cited by examiner

LABORATORY ANALYZER

CROSS-REFERENCE TO RELATED APPLICATIONS

This application claims priority to European Patent Application No. 20215126.2, filed 17 Dec. 2020, the disclosure of which is hereby incorporated by reference in its entirety.

TECHNICAL FIELD

The present disclosure refers to a laboratory analyzer and a method for displaying screen information onto a housing of a laboratory analyzer. The method and device specifically may be used in the field of medical or chemical laboratories, in particular for in vitro diagnostics (IVD). Other fields of application of the present disclosure, however, are feasible.

BACKGROUND

In vitro diagnostic testing has a major effect on clinical decisions, providing physicians with pivotal information. Particularly, there is great emphasis on providing quick and accurate test results in critical care settings. In vitro diagnostic testing is usually performed using instruments operable to execute one or more processing steps or workflow steps on one or more biological samples and/or one or more reagents, such as pre-analytical instruments, post-analytical instruments and also analytical instruments.

Analytical instruments or analyzers are configured to obtain a measurement value. An analyzer is operable to determine via various chemical, biological, physical, optical or other technical procedures a parameter value of the sample or a component thereof. An analyzer may be operable to measure said parameter of the sample or of at least one analyte and return the obtained measurement value. The list of possible analysis results returned by the analyzer comprises, without limitation, concentrations of the analyte in the sample, a digital (yes or no) result indicating the existence of the analyte in the sample (corresponding to a concentration above the detection level), optical parameters, DNA or RNA sequences, data obtained from mass spectroscopy of proteins or metabolites and physical or chemical parameters of various types. An analytical instrument may comprise units assisting with the pipetting, dosing, and mixing of samples and/or reagents.

The analyzer may comprise a reagent holding unit for holding reagents to perform the assays. Reagents may be arranged for example in the form of vessels, containers or cassettes containing individual reagents or group of reagents, placed in appropriate receptacles or positions within a storage compartment or conveyor. It may comprise a consumable feeding unit. The analyzer may comprise a process and detection system whose workflow is optimized for certain types of analysis. Examples of such analyzers are clinical chemistry analyzers, coagulation chemistry analyzers, immunochemistry analyzers, urine analyzers, and nucleic acid analyzers, used to detect the result of chemical or biological reactions or to monitor the progress of chemical or biological reactions.

In the field of medical or chemical laboratories, in particular clinical analyzers such as for IVD, currently, each instrument requires an external display or monitor. However, this is limiting in terms of footprint of the device, as well as on the way information is displayed, which either requires a large monitor or the information has to be scaled down accordingly.

Despite the achievement of the above-mentioned methods and devices, there is still a need for eliminating the need for an external monitor or display on any of the clinical analyzers.

It is therefore desirable to provide a method and devices which at least partially address the above-mentioned technical challenges of known methods and devices of similar kind. Specifically, a method and a device shall be proposed which allow for eliminating the need for an external monitor or display on any of the clinical analyzers.

SUMMARY

In accordance with one embodiment of the present disclosure, a laboratory analyzer is provided comprising a housing at least partially enclosing at least one analyzing instrument; and at least one display device, wherein the display device comprises at least one screen, wherein the screen is partially transparent and reflective, wherein the screen is integrated into the housing, wherein the display device is configured for displaying screen information on the screen such that the screen information is visible and/or readable from outside the housing.

In accordance with another embodiment of the present disclosure, a method for displaying screen information onto a housing of a laboratory analyzer is provided, wherein a laboratory analyzer according to an embodiment of the present disclosure is used, wherein the laboratory analyzer comprises a housing at least partially enclosing at least one analyzing instrument, wherein the method comprises displaying the screen information on at least one display device of the laboratory analyzer such that the screen information is visible and/or readable from outside the housing, wherein the display device comprises at least one screen, wherein the screen is at least partially transparent and at least partially reflective, wherein the screen is integrated into the housing.

These and other features and advantages of the embodiments of the present disclosure will be more fully understood from the following detailed description taken together with the accompanying claims. It is noted that the scope of the claims is defined by the recitations therein and not be the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with the reference number and in which:

FIG. 1 shows an embodiment of a laboratory analyzer according to the present disclosure.

Skilled artisans appreciate that elements in the figures are illustrated for simplicity and clarity and have not been drawn to scale. For example, dimensions of some of the elements in the figures may be exaggerated relative to other elements to help improve understanding of the embodiments of the present disclosure.

DETAILED DESCRIPTION

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, notwithstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the present disclosure and without any restriction regarding the possibility of combining the features introduced in such way with other optional or non-optional features of the present disclosure.

In a first aspect of the present disclosure a laboratory analyzer is disclosed. The term "laboratory" as used herein is a broad term and is to be given its ordinary and customary meaning to a person of ordinary skill in the art and is not to be limited to a special or customized meaning. The term specifically may refer, without limitation, to at least one environment comprising at least one analyzer and/or at least one instrument configured for analyzing at least one sample. The laboratory may be a location configured for work in the field of the natural sciences and/or engineering in the sense that it offers the opportunity to conduct corresponding measurements and controls.

The term "laboratory analyzer" as used herein is a broad term and is to be given its ordinary and customary meaning to a person of ordinary skill in the art and is not to be limited to a special or customized meaning. The term specifically may refer, without limitation, to a device configured for analyzing at least one sample, in particular a plurality of samples. The samples to be analyzed may be prepared for the analysis using at least one reagent. Particularly, the laboratory analyzer is used for electrochemical and/or spectroscopic experiments. The laboratory analyzer may be used in the field of medical or chemical laboratories, in particular for in vitro diagnostics (IVD). The laboratory analyzer may be configured for executing one or more processing steps and/or workflow steps on one or more biological samples and/or reagents. The term "processing step" thereby refers to physically executed processing steps such as centrifugation, aliquotation, sample analysis and the like. The term "analyzer" covers pre-analytical sample work-cells, post-analytical sample work-cells and also analytical work-cells.

The term "sample" as used herein is a broad term and is to be given its ordinary and customary meaning to a person of ordinary skill in the art and is not to be limited to a special or customized meaning. The term specifically may refer, without limitation, to an aliquot of a substance such as a chemical or biological compound. Specifically, the sample may be or may comprise at least one biological specimen, such as one or more of: blood; blood serum; blood plasma; urine; saliva. Additionally or alternatively, the sample may be or may comprise a chemical substance or compound and/or a reagent. The sample may specifically be a liquid sample, such as an aliquot of a fluid substance of the chemical or biological compound. For example, the liquid sample may be or may comprise at least one pure liquid, such as a liquid substance and/or a solution containing one or more liquid substances, comprising the at least one chemical and/or the biological substance. As another example, the liquid sample may be or may comprise a liquid mixture, such as a suspension, an emulsion and/or a dispersion of one or more chemical and/or biological substances. However, other, in particular non-liquid samples are possible. Other sample types may be, for example, tissue, homogenized material, or the like.

The sample to be analyzed may be carried by a sample tube. The term "sample tube" as used herein is a broad term and is to be given its ordinary and customary meaning to a person of ordinary skill in the art and is not to be limited to a special or customized meaning. The term specifically may refer, without limitation, to a container configured for one or more of containing, storing or transporting the sample. The sample tube may be a glass or transparent plastic tube. The sample tube may be a cylindrical tube, e.g., a cylindrical tube having a circular and/or polygonal cross-section. Other types or forms of sample tubes are also possible. The sample tube may comprise a tube bottom, a tube body and a cap, including a sealing of the cap. The tube bottom may be configured to confine the sample tube at the sample tube's lower end. The tube body may be configured for forming the shape of the sample tube. The cap may be configured for reversibly closing up the sample tube at the sample tube's upper end by using a mechanism of a specific sealing type. For example, the sample tube's cap sealing may comprise one or more of a screw type, a rubber type, a hemogard type or a push type. The upper and lower end of the sample tube may be defined by the way of usage of the sample tube.

The laboratory analyzer comprises
- a housing at least partially enclosing at least one analyzing instrument;
- at least one display device, wherein the display device comprises at least one screen, wherein the screen is at least partially transparent and at least partially reflective, wherein the screen is integrated into the housing, wherein the display device is configured for displaying screen in-formation on the screen such that the screen information is visible and/or readable from outside the housing.

The term "analyzing instrument" as used herein is a broad term and is to be given its ordinary and customary meaning to a person of ordinary skill in the art and is not to be limited to a special or customized meaning. The term specifically may refer, without limitation, to an arbitrary device configured for analyzing at least one sample. For example, the analyzing instrument may be configured for conducting at least one chemical analysis.

As further used herein, the term "housing", also denoted as cover, is a broad term and is to be given its ordinary and customary meaning to a person of ordinary skill in the art and is not to be limited to a special or customized meaning. The term specifically may refer, without limitation, to a basically arbitrary element which is configured for fully or partially enclosing and/or covering one or more components and for providing protection for these one or more components, such as against environmental influences and/or mechanical influence and/or humidity. The housing, specifically, may be or may comprise a rigid housing, such as a rigid housing made of one or more of a plastic material, a metallic material or a cardboard material. The term "at least partially enclosing" as used herein is a broad term and is to be given its ordinary and customary meaning to a person of ordinary skill in the art and is not to be limited to a special or customized meaning. The term specifically may refer, without limitation, to embodiments in which the housing completely encloses the analyzing instrument and to embodiments in which parts or elements of the analyzing instrument are uncovered by the housing. The housing may comprise at least one opening allowing access to the analytical instrument. For example, the housing may comprise at least one front door. The front door may be openable and closable. The front door may be one or more of movable, slideable, or swingable from a closed state into an open state and vice versa. For example, the front door may be an upward opening, in particular sliding, door.

As further used herein, the term "display device" is a broad term and is to be given its ordinary and customary meaning to a person of ordinary skill in the art and is not to be limited to a special or customized meaning. The term specifically may refer, without limitation, to at least one electronic device comprising at least one display. As further used herein, the term "display" is a broad term and is to be given its ordinary and customary meaning to a person of ordinary skill in the art and is not to be limited to a special or customized meaning. The term specifically may refer, without limitation, to an arbitrary shaped device configured for displaying an item of information such as at least one image, at least one diagram, at least one histogram, at least one text, at least one sign. The display devices comprises the at least one screen. The screen may have an arbitrary shape, typically a rectangular shape. The screen may be defined by and/or adjusted to the shape of the housing, in particular of the front door.

The screen is at least partially transparent and at least partially reflective. As used herein, the term "transparent" is a broad term and is to be given its ordinary and customary meaning to a person of ordinary skill in the art and is not to be limited to a special or customized meaning. The term specifically may refer, without limitation, to a property of the screen to allow light, in particular of a certain wavelength range, to pass through. As used herein, the term "reflective" is a broad term and is to be given its ordinary and customary meaning to a person of ordinary skill in the art and is not to be limited to a special or customized meaning. The term specifically may refer, without limitation, to a property of the screen to hinder light, in particular of a certain wavelength range, to pass through. For example, the screen may have a transparency of 25% to 50%, typically of 30% to 40%. Specifically, the screen may have a transparency in the visible spectral range of 25% to 50%, typically of 30% to 40%. The visible spectral range may range from 500 nm to 780 nm.

The screen may be configured such that dark content displayed on the screen appears transparent. In particular, the screen may allow seeing through from an outside of the housing to an inside of the housing, in particular for observing the analytical instrument and/or the sample and the like. The screen may be configured such that light contents displayed on the screen appear to be opaque.

The screen is integrated, in particular partially or completely, into the housing. As used herein, the term "integrated into the housing" is a broad term and is to be given its ordinary and customary meaning to a person of ordinary skill in the art and is not to be limited to a special or customized meaning. The term specifically may refer, without limitation, to the fact that at least one element of the screen is integrated, in particular is part of, the housing. Embodiments may be possible in which the screen is completely integrated into the housing. Alternatively, parts of the screen such as electronics, controller and the like may be arranged deviating from the housing.

The display device is configured for displaying screen information on the screen such that the screen information is visible and/or readable from outside the housing. As used herein, the term "screen information" is a broad term and is to be given its ordinary and customary meaning to a person of ordinary skill in the art and is not to be limited to a special or customized meaning. The term specifically may refer, without limitation, to arbitrary information relating to the laboratory analyzer such as information about the sample, information about the laboratory analyzer, e.g., a status, controlling information, operating information, commands and the like. The screen information may comprise at least one user interface and/or may be used as user interface. In particular, the screen information may comprise an operating panel and/or a controller menu of the laboratory analyzer. However, other screen information may be possible. For example, the screen information may comprise a keyboard. The screen information may comprise at least one hologram.

The display device may comprise at least one head-up display device and/or at least one organic light emitting diode (OLED) display, in particular an OLED foil display. Specifically, the laboratory analyzer, in particular the IVD analyzer, may comprise the housing with head-up display technology.

As used herein, the term "head-up display" is a broad term and is to be given its ordinary and customary meaning to a person of ordinary skill in the art and is not to be limited to a special or customized meaning. The term specifically may refer, without limitation, to any transparent display that presents data without requiring users to look away from their usual viewpoints. The screen may be configured as projection screen of the at least one head-up display device. The head-up display device may comprise at least one imaging unit configured for generating and providing the screen information to the projection screen. The imaging unit may comprises at least one projector, e.g., at least one beamer, configured for projecting the screen information on the projection screen. The projector may be arranged inside the housing such as at a wall opposing the front door. However, other positions for arranging the projector may be possible, e.g., by using at least one reflective element such as a mirror. The projector may be configured for projecting the screen information on the projection screen such that the screen information is visible and/or readable from outside the housing, in particular by a user positioned in front of the front door. The screen may be at least partially integrated into the front door.

As used herein, the term "organic light emitting diode" is a broad term and is to be given its ordinary and customary meaning to a person of ordinary skill in the art and is not to be limited to a special or customized meaning. The term specifically may refer, without limitation, to a light-emitting diode (LED) in which an emissive electroluminescent layer is a film of organic compound configured for emitting light in response to an electric current. The OLED display may be configured for emitting visible light. Specifically, the OLED display may be a transparent OLED (TOLED) display. The OLED display may be non-visible and transparent in an inactive state. The OLED display, in particular its content, may be visible in an activated state.

The screen may comprise at least one interactive surface configured for providing a human-machine interface. The term "interactive surface" as used herein is a broad term and is to be given its ordinary and customary meaning to a person of ordinary skill in the art and is not to be limited to a special or customized meaning. The term specifically may refer, without limitation, to an interface configured for receiving at least one user input such as by touching and/or gesture recognition. The screen may be configured as input device. Specifically, the interactive surface comprises at least one touch screen. The touch screen may be touched by a finger or stylus. Additionally or alternatively, the interactive surface may be configured for gesture recognition, in particular hand gesture recognition. The laboratory analyzer may comprise at least one camera configured for recording gestures. This may allow that touching the screen would not even be necessary.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, two-dimensional or even three-dimensional optical data or information. The camera may be a pixelated camera comprising a matrix of pixels. As an example, the camera may comprise at least one camera chip, such as at least one CCD chip and/or at least one CMOS chip configured for recording images.

The screen may be configured for receiving the input and for sending it to a processing unit, in particular a controller, of the laboratory analyzer for processing. The processing unit may be configured for controlling and/or operating the laboratory analyzer based on the received input. Specifically, the processing unit may be configured for gesture recognition by evaluating the gestures recorded by the camera. The processing unit may be configured for transforming the recognized gesture into a control and/or operating command for controlling and/or operating the laboratory analyzer.

The laboratory analyzer may comprise at least one camera configured for controlling processes of the laboratory analyzer. For example, said camera may be configured for controlling a gripper of a tube sorting device. Said camera may be used for detecting gesture control. The camera may be used for recognizing gestures of the laboratory technician who uses the displayed keyboard or menu.

The laboratory analyzer may comprise the at least one processing unit configured for providing the screen information and/or configured for processing user input obtained via the screen. The term "processing unit" as used herein is a broad term and is to be given its ordinary and customary meaning to a person of ordinary skill in the art and is not to be limited to a special or customized meaning. The term specifically may refer, without limitation, to an arbitrary device adapted to perform the controlling and processing, typically by using at least one data processing device and, more typically, by using at least one processor and/or at least one application-specific integrated circuit. Thus, as an example, the processing unit may comprise one or more programmable devices such as one or more computers, application-specific integrated circuits (ASICs), Field Programmable Gate Arrays (FPGAs), or other devices which are configured for performing the controlling and/or processing. Thus, as an example, the at least one processing unit may comprise at least one data processing device having a software code stored thereon comprising a number of computer commands. The processing unit may provide one or more hardware elements for performing one or more of the named operations and/or may provide one or more processors with software running thereon for performing one or more of the named operation.

The laboratory analyzer may comprise at least one communication interface. The communication interface may be configured for displaying the screen information on at least one portable device such as a tablet or other smart device associated with the laboratory analyzer. The communication interface may be configured for displaying screen information on a tablet or another smart device associated with laboratory analyzer when housing is open. This may allow achieving the goal to get rid of additional monitors. The communication interface may specifically provide means for transferring or exchanging information. In particular, the communication interface may provide a data transfer connection, e.g., Bluetooth, NFC, inductive coupling or the like. As an example, the communication interface may be or may comprise at least one port comprising one or more of a network or internet port, a USB-port and a disk drive.

For example, the laboratory analyzer may be configured for projecting and/or integrating the operating panel and/or the controller menu onto and/or in the housing, in particular the front door, of the IVD analyzer. This may be realized by either in form of a head-up display and/or using an OLED display. The screen may be used as input device as well and may work like a touch screen touched by a finger or stylus to register events and send them to the processing unit for processing. Thus, an external monitor can be replaced with that.

The present disclosure may allow eliminating the need for an external monitor or display on any of the clinical analyzers, by using their cover or housing for displaying whatever information would be normally shown on the external monitor or display. This can be enabled by using the same technology as the "head-up displays". Optionally, the housing may also have touch sensing capacities and/or even hand gesture recognition.

In a further aspect, the present disclosure discloses a method for displaying screen information onto a housing of a laboratory analyzer, wherein a laboratory analyzer according to the present disclosure is used. The laboratory analyzer comprises a housing at least partially enclosing at least one analyzing instrument. The method comprises displaying the screen information on at least one display device of the laboratory analyzer such that the screen information is visible and/or readable from outside the housing. The display device comprises at least one screen. The screen is at least partially transparent and at least partially reflective, wherein the screen is integrated into the housing.

The method may be computer-implemented. The term "computer-implemented" as used herein is a broad term and is to be given its ordinary and customary meaning to a person of ordinary skill in the art and is not to be limited to a special or customized meaning. The term specifically may refer, without limitation, to a process which is fully or partially implemented by using a data processing means, such as data processing means comprising at least one processor, in particular the processing unit. The term "computer", thus, may generally refer to a device or to a combination or network of devices having at least one data processing means such as at least one processor. The computer, additionally, may comprise one or more further components, such as at least one of a data storage device, an electronic interface or a human-machine interface.

Further disclosed and proposed herein is a computer program including computer-executable instructions for performing the method according to the present disclosure in one or more of the embodiments enclosed herein when the program is executed on a computer or computer network. Specifically, the computer program may be stored on a computer-readable data carrier and/or on a computer-readable storage medium.

As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Thus, specifically, one, more than one or even all of method steps as indicated above may be performed by using a computer or a computer network, typically by using a computer program.

Further disclosed and proposed herein is a computer program product having program code means, in order to perform the method according to the present disclosure in one or more of the embodiments enclosed herein when the program is executed on a computer or computer network. Specifically, the program code means may be stored on a computer-readable data carrier and/or on a computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and proposed herein is a computer program product with program code means stored on a machine-readable carrier, in order to perform the method according to one or more of the embodiments disclosed herein, when the program is executed on a computer or computer network. As used herein, a computer program product refers to the program as a tradable product. The product may generally exist in an arbitrary format, such as in a paper format, or on a computer-readable data carrier and/or on a computer-readable storage medium. Specifically, the computer program product may be distributed over a data network.

Finally, disclosed and proposed herein is a modulated data signal which contains instructions readable by a computer system or computer network, for performing the method according to one or more of the embodiments disclosed herein.

Referring to the computer-implemented aspects of the disclosure, one or more of the method steps or even all of the method steps of the method according to one or more of the embodiments disclosed herein may be performed by using a computer or computer network. Thus, generally, any of the method steps including provision and/or manipulation of data may be performed by using a computer or computer network. Generally, these method steps may include any of the method steps, typically except for method steps requiring manual work, such as providing the samples and/or certain aspects of performing the actual measurements.

Specifically, further disclosed herein are:

a computer or computer network comprising at least one processor, wherein the processor is adapted to perform the method according to one of the embodiments described in this description, a computer loadable data structure that is adapted to perform the method according to one of the embodiments described in this description while the data structure is being executed on a computer, a computer program, wherein the computer program is adapted to perform the method according to one of the embodiments described in this description while the program is being executed on a computer, a computer program comprising program means for performing the method according to one of the embodiments described in this description while the computer program is being executed on a computer or on a computer network, a computer program comprising program means according to the preceding embodiment, wherein the program means are stored on a storage medium readable to a computer, a storage medium, wherein a data structure is stored on the storage medium and wherein the data structure is adapted to perform the method according to one of the embodiments described in this description after having been loaded into a main and/or working storage of a computer or of a computer network, and a computer program product having program code means, wherein the program code means can be stored or are stored on a storage medium, for performing the method according to one of the embodiments described in this description, if the program code means are executed on a computer or on a computer network.

Summarizing and without excluding further possible embodiments, the following embodiments may be envisaged:

Embodiment 1. A laboratory analyzer comprising:
  a housing at least partially enclosing at least one analyzing instrument;
  at least one display device, wherein the display device comprises at least one screen, wherein the screen is partially transparent and reflective, wherein the screen is integrated into the housing, wherein the display device is configured for displaying screen information on the screen such that the screen information is visible and/or readable from outside the housing.

Embodiment 2. The laboratory analyzer according to the preceding embodiment, wherein the display device comprises at least one head-up display device and/or at least one organic light emitting diode (OLED) display.

Embodiment 3. The laboratory analyzer according to the preceding embodiment, wherein the screen is a projection screen of the at least one head-up display device, wherein the head-up display device comprises at least one imaging unit configured for generating and providing the screen information to the projection screen.

Embodiment 4. The laboratory analyzer according to the preceding embodiment, wherein the imaging unit comprises at least one projector configured for projecting the screen information on the projection screen.

Embodiment 5. The laboratory analyzer according to the preceding embodiment, wherein the projector is arranged inside the housing, wherein the projector is configured for projecting the screen information on the projection screen such that the screen information is visible and/or readable from outside the housing.

Embodiment 6. The laboratory analyzer according to any one of the preceding embodiments, wherein the housing comprises a front door, wherein the screen is at least partially integrated into the front door.

Embodiment 7. The laboratory analyzer according to any one of the preceding embodiments, wherein the screen information comprises an operating panel and/or a controller menu of the laboratory analyzer.

Embodiment 8. The laboratory analyzer according to any one of the preceding embodiments, wherein the screen comprises at least one interactive surface configured for providing a human-machine interface.

Embodiment 9. The laboratory analyzer according to the preceding embodiment, wherein the interactive surface comprises at least one touch screen.

Embodiment 10. The laboratory analyzer according to any one of the two preceding embodiments, wherein the interactive surface is configured for gesture recognition.

Embodiment 11. The laboratory analyzer according to any one of the preceding embodiments, wherein the laboratory analyzer comprises at least one processing unit configured for providing the screen information and/or configured for processing user input obtained via the screen.

Embodiment 12. The laboratory analyzer according to any one of the preceding embodiments, wherein the laboratory analyzer comprises at least one communication interface, wherein the communication interface is configured for displaying the screen information on at least one portable device associated with the laboratory analyzer.

Embodiment 13. The laboratory analyzer according to any one of the preceding embodiments, wherein the laboratory analyzer comprises at least one camera configured for controlling processes of the laboratory analyzer, wherein said camera is usable for detecting gesture control in addition.

Embodiment 14. Method for displaying screen information onto a housing of a laboratory analyzer, wherein a laboratory analyzer according to any one of the preceding embodiments is used, wherein the laboratory analyzer comprises a housing at least partially enclosing at least one analyzing instrument, wherein the method comprises displaying the screen information on at least one display device of the laboratory analyzer such that the screen information is visible and/or readable from outside the housing, wherein the display device comprises at least one screen, wherein the screen is at least partially transparent and at least partially reflective, wherein the screen is integrated into the housing.

Embodiment 15. The method according to the preceding embodiment, wherein the method is computer-implemented.

In order that the embodiments of the present disclosure may be more readily understood, reference is made to the following examples, which are intended to illustrate the disclosure, but not limit the scope thereof.

FIG. 1 shows, in a highly schematic fashion, an exemplary embodiment of a laboratory analyzer 110 according to the present disclosure. The laboratory analyzer may be used within a laboratory. The laboratory may be a location configured for work in the field of the natural sciences and/or engineering in the sense that it offers the opportunity to conduct corresponding measurements and controls. The laboratory analyzer 110 may be configured for analyzing at least one sample, in particular a plurality of samples. The samples to be analyzed may be prepared for the analysis using at least one reagent. Particularly, the laboratory analyzer 110 is used for electrochemical and/or spectroscopic experiments. The laboratory analyzer 110 may be used in the field of medical or chemical laboratories, in particular for in vitro diagnostics (IVD). The laboratory analyzer 110 may be configured for executing one or more processing steps and/or workflow steps on one or more biological samples and/or reagents. The processing step may comprise one or more of centrifugation, aliquotation, sample analysis and the like. The laboratory analyzer 110 may be or may comprise one or more of a pre-analytical sample work-cells, post-analytical sample work-cells and also analytical work-cells.

Specifically, the sample may be or may comprise at least one biological specimen, such as one or more of: blood; blood serum; blood plasma; urine; saliva. Additionally or alternatively, the sample may be or may comprise a chemical substance or compound and/or a reagent. The sample may specifically be a liquid sample, such as an aliquot of a fluid substance of the chemical or biological compound. For example, the liquid sample may be or may comprise at least one pure liquid, such as a liquid substance and/or a solution containing one or more liquid substances, comprising the at least one chemical and/or the biological substance. As another example, the liquid sample may be or may comprise a liquid mixture, such as a suspension, an emulsion and/or a dispersion of one or more chemical and/or biological substances. However, other, in particular non-liquid samples are possible. Other sample types may be, for example, tissue, homogenized material, or the like. The samples may be carried by in sample tubes 112.

The laboratory analyzer 110 comprises at least one analyzing instrument 114. The analyzing instrument 114 may be an arbitrary device configured for analyzing at least one sample. For example, the analyzing instrument 114 may be configured for conducting at least one chemical analysis. The analyzing instrument 114 may comprise at least one x-y-z-gateway 116 for handling the sample tubes 112. The analyzing instrument 114 may comprise at least one tube gripper 118 for selecting, positioning and holding one of the sample tubes 112 during analysis.

The laboratory analyzer 110 comprises a housing 120. The housing 116 is configured for at least partially enclosing the analyzing instrument 114. The housing 120 is configured for fully or partially enclosing and/or covering one or more components and for providing protection for these one or more components, such as against environmental influences and/or mechanical influence and/or humidity. The housing 120, specifically, may be or may comprise a rigid housing, such as a rigid housing made of one or more of a plastic material, a metallic material or a cardboard material. The housing 120 may comprise at least one opening 122 allowing access to the analytical instrument. For example, the housing 120 may comprise at least one front door 124. The front door 124 may be openable and closable. The front door 124 may be one or more of movable, slideable, or swingable from a close state into an open state and vice versa. For example, the front door 124 may be an upward opening, in particular sliding, door.

The laboratory analyzer comprises at least one display device 126. The display device 126 comprises at least one screen 128. The screen 128 may have an arbitrary shape, typically a rectangular shape. The screen 128 may be defined by and/or adjusted to the shape of the housing 120, in particular of the front door 124.

The screen 128 is at least partially transparent and at least partially reflective. For example, the screen 128 may have a transparency of 25% to 50%, typically 30% to 40%. Specifically, the screen may have a transparency in the visible spectral range of 25% to 50%, typically of 30% to 40%.

The screen 128 may be configured such that dark content displayed on the screen 128 appears transparent. In particular, the screen 128 may allow seeing through from an outside of the housing 120 to an inside of the housing 120, in particular for observing the analytical instrument 114 and/or the sample and the like. The screen 128 may be configured such that light contents displayed on the screen 128 appear to be opaque.

The screen 128 is integrated, in particular partially or completely, into the housing 120. The display device 126 is configured for displaying screen information on the screen 128 such that the screen information is visible and/or readable from outside the housing 120. The screen information may be or may comprise arbitrary information relating to the laboratory analyzer 110 such as information about the sample, information about the laboratory analyzer 110, e.g., a status, controlling information, operating information, commands and the like. The screen information may be used as user interface. In particular, the screen information may comprise an operating panel and/or a controller menu of the laboratory analyzer 110. However, other screen information may be possible. For example, the screen information may comprise a keyboard. The screen information may comprise at least one hologram.

The display device 126 may comprise at least one head-up display device 130 and/or at least one organic light emitting diode (OLED) display, in particular an OLED foil display. Specifically, the laboratory analyzer 110, in particular the IVD analyzer, may comprise the housing 120 with head-up display technology.

The head-up display 130 may be or may comprise a transparent display that presents data without requiring users to look away from their usual viewpoints. The screen 128 may be configured as projection screen of the at least one head-up display device 130. The head-up display device 130 may comprise at least one imaging unit 132 configured for generating and providing the screen information to the projection screen. The imaging unit 132 may comprises at least one projector, e.g., at least one beamer, configured for projecting the screen information on the projection screen. The projector may be arranged inside the housing 120 such as at a wall opposing the front door 124. However, other positions for arranging the projector may be possible, e.g., by using at least one reflective element such as a mirror. The projector may be configured for projecting the screen information on the projection screen such that the screen information is visible and/or readable from outside the housing 120, in particular by a user positioned in front of the front door 124. The screen 128 may be at least partially integrated into the front door.

The screen 128 may comprise at least one interactive surface 134 configured for providing a human-machine interface. The interactive surface 134 may be an interface configured for receiving at least one user input such as by touching and/or gesture recognition. The screen 128 may be configured as input device. Specifically, the interactive surface 134 comprises at least one touch screen. The touch screen may be touched by a finger or stylus. Additionally or alternatively, the interactive surface 134 may be configured for gesture recognition, in particular hand gesture recognition. For this purpose, the laboratory analyzer 110 may comprise at least one camera 136 configured for recording gestures. This may allow that touching the screen would not even be necessary. The screen 128 may be configured for receiving the input and for sending it to a processing unit 138, in particular a controller, of the laboratory analyzer 110 for processing. The processing unit 138 may be configured for controlling and/or operating the laboratory analyzer 110 based on the received input. Specifically, the processing unit 138 may be configured for gesture recognition by evaluating the gestures, in particular gesture control, recorded and/or detected by the camera 136. The processing unit 138 may be configured for transforming the recognized gesture into a control and/or operating command for controlling and/or operating the laboratory analyzer 110. The camera 136, in addition, is usable for monitoring processes of the laboratory analyzer 110 and, thus, for controlling processes of the laboratory analyzer 110.

The laboratory analyzer 110 may comprise at least one communication interface 140. The communication interface 140 may be configured for displaying the screen information on at least one portable device 142 such as a tablet or other smart device associated with the laboratory analyzer 110. The communication interface 140 may be configured for displaying screen information on a tablet or another smart device associated with laboratory analyzer when housing is open. This may allow achieving the goal to get rid of additional monitors. The communication interface 140 may specifically provide means for transferring or exchanging information. In particular, the communication interface 140 may provide a data transfer connection, e.g., Bluetooth, NFC, inductive coupling or the like. As an example, the communication interface may be or may comprise at least one port comprising one or more of a network or internet port, a USB-port and a disk drive.

For example, the laboratory analyzer 110 may be configured for projecting and/or integrating the operating panel and/or a controller menu onto and/or in the housing 120, in particular the front door 124, of the IVD analyzer. This may be realized by either in form of a head-up display 130 and/or using an OLED display. The screen 128 may be used as input device as well and may work like a touch screen touched by a finger or stylus to register events and send them to the processing unit 138 for processing. Thus, an external monitor can be replaced with that.

LIST OF REFERENCE NUMBERS

110 laboratory analyzer
112 sample tube
114 analyzing instrument
116 x-y-z-gateway
118 tube gripper
120 housing
122 opening
124 front door
126 display device
128 screen
130 head-up display device
132 imaging unit
134 interactive surface
136 camera
138 processing unit
140 communication interface
142 portable device

What is claimed is:
1. A laboratory analyzer comprising:
at least one analyzing instrument selected from the group consisting of a pre-analytical sample work-cell, an analytical sample work-cell, and a post-analytical sample work-cell, the at least one analyzing instrument executing at least one processing step on one or more biological samples and/or reagents, the at least one processing step being selected from the group consisting of centrifugation, aliquotation, and sample analysis;

a housing at least partially enclosing the at least one analyzing instrument;

at least one camera configured for controlling the executing of the at least one processing step on a sample and/or reagent by the laboratory analyzer, wherein said at least one camera is usable for detecting gesture control in addition to controlling the executing of the at least one processing step on the sample and/or reagent, and wherein in use of the laboratory analyzer, the at least one camera provides input indicative of a detected gesture that is used to control the executing of the at least one processing step on the sample and/or reagent; and at least one display device, wherein the at least one display device comprises at least one screen, wherein the at least one screen is partially transparent and partially reflective, wherein the at least one screen is integrated into the housing, wherein the at least one display device is configured for displaying screen information on the at least one screen such that the screen information is visible and/or readable from outside the housing, and wherein the display of screen information allows the screen information to be seen through from outside of the housing to inside of the housing.

2. The laboratory analyzer according to claim 1, wherein the at least one display device comprises at least one head-up display device and/or at least one organic light emitting diode (OLED) display.

3. The laboratory analyzer according to claim 2, wherein the at least one screen is a projection screen of the at least one head-up display device, wherein the at least one head-up display device comprises at least one imaging unit configured for generating and providing the screen information to the projection screen.

4. The laboratory analyzer according to claim 3, wherein the at least one imaging unit comprises at least one projector configured for projecting the screen information on the projection screen.

5. The laboratory analyzer according to claim 4, wherein the at least one projector is arranged inside the housing, wherein the at least one projector is configured for projecting the screen information on the projection screen such that the screen information is visible and/or readable from outside the housing.

6. The laboratory analyzer according to claim 1, wherein the housing comprises a front door, wherein the at least one screen is at least partially integrated into the front door.

7. The laboratory analyzer according to claim 1, wherein the screen information comprises an operating panel and/or a controller menu of the laboratory analyzer.

8. The laboratory analyzer according to claim 1, wherein the at least one screen comprises at least one interactive surface configured for providing a human-machine interface.

9. The laboratory analyzer according to claim 8, wherein the at least one interactive surface comprises at least one touch screen.

10. The laboratory analyzer according to claim 8, wherein the at least one interactive surface is configured for gesture recognition.

11. The laboratory analyzer according to claim 1, further comprising at least one processing unit configured for providing the screen information and/or configured for processing user input obtained via the at least one screen.

12. The laboratory analyzer according to claim 1, further comprising at least one communication interface, wherein the at least one communication interface is configured for displaying the screen information on at least one portable device associated with the laboratory analyzer.

13. A method for displaying screen information onto the housing of the laboratory analyzer according to claim 1, the method comprising displaying the screen information on the at least one display device of the laboratory analyzer such that the screen information is visible and/or readable from outside the housing.

14. The method according to claim 13, wherein the method is computer-implemented.

15. The laboratory analyzer according to claim 1, wherein the sample analysis comprises a chemical analysis.

16. The laboratory analyzer according to claim 1, wherein the at least one camera has a view including the inside of the housing.

17. The laboratory analyzer according to claim 1 wherein the at least one camera is located inside of the housing.

18. The laboratory analyzer according to claim 1, wherein the at least one camera is configured for monitoring the at least one processing step on the sample and/or reagent.

19. A laboratory analyzer comprising:

at least one analyzing instrument selected from the group consisting of a pre-analytical sample work-cell, an analytical sample work-cell, and a post-analytical sample work-cell, the at least one analyzing instrument executing at least one processing step on one or more biological samples and/or reagents, the at least one processing step being selected from the group consisting of centrifugation, aliquotation, and sample analysis;

a housing at least partially enclosing the at least one analyzing instrument;

at least one camera configured for controlling the executing of the at least one processing step on a sample and/or reagent by the laboratory analyzer, wherein said at least one camera is usable for detecting gesture control in addition to controlling the executing of the at least one processing step on the sample and/or reagent, and wherein in use of the laboratory analyzer, the at least one camera provides input indicative of a detected gesture to a processing unit that transforms the input into a command for executing the at least one processing step on the sample and/or reagent; and at least one display device, wherein the at least one display device comprises at least one screen, wherein the at least one screen is partially transparent and partially reflective, wherein the at least one screen is integrated into the housing, wherein the at least one display device displays screen information on the at least one screen such that the screen information is visible and/or readable from outside the housing, and wherein the display of screen information allows the screen information to be seen through from outside of the housing to inside of the housing.

20. The laboratory analyzer according to claim 19, wherein the at least one display device comprises at least one head-up display device and/or at least one organic light emitting diode (OLED) display.

21. The laboratory analyzer according to claim 20, wherein the at least one screen is a projection screen of the at least one head-up display device, wherein the at least one head-up display device comprises at least one imaging unit configured for generating and providing the screen information to the projection screen.

22. The laboratory analyzer according to claim 21, wherein the at least one imaging unit comprises at least one projector configured for projecting the screen information on the projection screen.

23. The laboratory analyzer according to claim 22, wherein the at least one projector projects the screen information from behind the at least one screen.

24. The laboratory analyzer according to claim 23, wherein a person is able to see the laboratory analyzer through the at least one screen due to the degree of transparency of the at least one screen.

25. The laboratory analyzer according to claim 23, wherein a person is able to see the laboratory analyzer through the at least one screen, and read the information on the at least one screen.

26. A laboratory analyzer comprising:

at least one analyzing instrument executing at least one processing step on one or more biological samples and/or reagents, a housing at least partially enclosing the at least one analyzing instrument;

at least one camera configured for controlling the executing of the at least one processing step on a sample and/or reagent by the laboratory analyzer, wherein said at least one camera is usable for detecting gesture control in addition to controlling the executing of the at least one processing step on the sample and/or reagent, and wherein in use of the laboratory analyzer, the at least one camera provides input indicative of a detected gesture to a processing unit that transforms the input into a command for executing the at least one processing step on the sample and/or reagent; and at least one display device, wherein the at least one display device comprises at least one screen, wherein the at least one screen is partially transparent and partially reflective, wherein the at least one screen is integrated into the housing, and wherein the at least one display device comprises at least one head-up display device and/or at least one organic light emitting diode (OLED) display.

27. The laboratory analyzer of claim 26, wherein the at least one processing step is selected from the group consisting of centrifugation, aliquotation, and sample analysis.

28. The laboratory analyzer of claim 26, wherein the at least one analyzing instrument is selected from the group consisting of a pre-analytical sample work-cell, an analytical sample work-cell, and a post-analytical sample work-cell.

29. The laboratory analyzer of claim 26, wherein the at least one display device displays screen information on the at least one screen such that the screen information is visible and/or readable from outside the housing.

* * * * *